United States Patent Office 2,820,025
Patented Jan. 14, 1958

2,820,025
HOMOPOLYMERS FROM 2,2,2-TRIFLUORO-ETHYL VINYL ETHER

Calvin E. Schildknecht, Montclair, N. J., assignor to Air Reduction Company, Incorporated, New York, N. Y., a corporation of New York No Drawing. Application February 8, 1954
Serial No. 409,057

13 Claims. (Cl. 260—91.1)

The present invention relates to the polymerization of trifluoroethyl vinyl ether and, more specifically, to relatively high molecular weight, rubberlike, form-stable, non-tacky polymers of 2,2,2-trifluoroethyl vinyl ether and method of preparing the same.

Previous attempts to prepare polymers of trifluoroethyl vinyl ether have resulted in soft, non-rubbery, waxlike or tacky products. The usual methods of polymerizing alkyl vinyl ethers have heretofore universally proved inapplicable for obtaining relatively high molecular weight, rubberlike, form-stable, non-tacky polymers of trifluoroethyl vinyl ether. For example, heat polymerization of trifluoroethyl vinyl ether with peroxide catalysts has proved unsuccessful. Similarly, polymerization with a Friedel-Crafts catalyst in the absence of an activating solvent has produced only relatively low molecular weight polymers.

Accordingly, it is an object of this invention to prepare relatively high molecular weight, form-stable, non-tacky, rubberlike polymers of trifluoroethyl vinyl ether.

It is another object to prepare rubberlike polymers which are resistant to hydrocarbon oils at high temperatures.

It is a further object of this invention to provide a process for the preparation of relatively high molecular weight, form-stable, non-tacky, rubberlike polymers of trifluoroethyl vinyl ether.

An additional object is to provide a method for so quenching and washing such polymers that they do not decompose or discolor even in the absence of a stabilizer.

Other objects will in part appear herein and will in part be obvious from the description which follows.

In accordance with the present invention, relatively high molecular weight, form-stable, rubberlike, non-tacky polymers of trifluoroethyl vinyl ether may now be obtained. I have found that these rubberlike polymers of trifluoroethyl vinyl ether are extremely resistant to hydrocarbon oils and other common solvents even at high temperatures, which property would make these polymers extremely useful as a substitute for other rubbery materials which would fail under conditions of use requiring high temperatures and contact with such solvents. Concentrated solutions of these polymers, when drawn out, show a surprising tendency to form fibers or filaments. The properties of these polymers for certain applications can be improved by vulcanizing or cross-linking the polymer.

The monomer, 2,2,2-trifluoroethyl vinyl ether (herein referred to simply as trifluoroethyl vinyl ether), can be represented by the following formula:

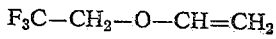

In general, 2,2,2-trifluoroethyl vinyl ether can be prepared by vinylation of 2,2,2-trifluoroethanol with acetylene in the presence of the corresponding alkali metal alcoholate, for example, potassium 2,2,2-trifluoroethanolate. A more detailed description may be found in the copending applications of Julius G. Shukys, Serial Number 290,582, filed May 28, 1952, now abandoned, and Serial Number 357,901, filed May 27, 1953.

According to the process of the present invention, relatively high molecular weight, form-stable, non-tacky, rubberlike polymers of trifluoroethyl vinyl ether are prepared by contacting a solution of purified trifluoroethyl vinyl ether in a low boiling chlorine-containing solvent, such as chloroform, methyl chloride, methylene chloride, or ethyl chloride with a Friedel-Crafts type catalyst at low sub-zero temperatures, e. g. ranging from −40° C. to −100° C. By the term "purified" trifluoroethyl vinyl ether is meant trifluoroethyl vinyl ether substantially free from alcohol or aldehyde materials.

The trifluoroethyl vinyl ether may be purified by subjecting it to an acid wash with a mineral acid followed by fractional distillation. The above-referred to Shukys' application Serial Number 357,901 gives a more detailed disclosure of the method for purifying trifluoroethyl vinyl ether. Such purity has been found advantageous in preparing relatively high molecular weight, rubberlike, form-stable, non-tacky polymers. The reaction conditions must be carefully controlled to avoid centers of excessive heat and reaction, since, if such local "hot spots" are obtained, only low polymers, i. e. dimers and trimers, would be formed. Cooling media must be carefully applied to the reaction to control the temperature thereof. It has been found that it is advantageous to employ granular Dry Ice as the cooling medium and to insert this cooling medium inside the reaction vessel in intimate contact with the reactants. The catalyst should likewise be cooled to the reaction temperature (−40° C. to −100° C.) before bringing it into contact with the trifluoroethyl vinyl ether solution. And, it is also advisable to add the catalyst small portionwise in droplet form in order to avoid local centers of excessive heat and reaction.

It has been further found that it is essential to employ a low boiling chlorine-containing solvent as the reaction medium. Such chlorine-containing solvents seem to activate the polymerization and it is difficult, if not impossible, to obtain relatively high molecular weight polymers of trifluoroethyl vinyl ether without their use. While methyl chloride, methylene chloride, or ethyl chloride are illustrative of the low boiling chlorine-containing solvents which are suitable as the reaction medium, chloroform has been found to be the preferred solvent. It is not necessary to employ these chlorine-containing solvents alone. Mixtures of them with low boiling saturated aliphatic hydrocarbons such as petroleum ether, propane, ethane, pentane, or hexane may be used. The proportions of chlorine-containing solvent to hydrocarbon is usually in the range of about 2 parts by volume of the chlorine-containing solvent to about 3 parts by volume of the saturated lower aliphatic hydrocarbon solvent. Low boiling solvents are preferred, since, as they vaporize, they function as internal coolants, thereby tending to keep the temperature at the seat of the reaction from becoming too high. The melting point of the solvent or solvent mixture, together with the monomer, trifluoroethyl vinyl ether, should be sufficiently low enough so that the reaction medium, at least at the start of the reaction, is in the liquid state. For example, carbon tetrachloride, which crystallizes at the reaction temperature, is not a useful solvent for obtaining the polymers of this invention.

The presence of small traces of water in the reaction medium enhances the polymerization and facilitates the obtainment of relatively high molecular weight polymers of trifluoroethyl vinyl ether. It is believed that the small traces of water serve as a co-catalyst for the reaction.

Among the Friedel-Crafts type catalyst which have been found useful are solutions of aluminum chloride, stannic chloride, boron trifluoride, titanium chloride, and gallium trichloride. Boron trifluoride-diethyl ether complex is preferred as the catalyst material, however, other ether complexes of boron fluorides may be used. For example, dipropyl ether, ethyl methyl ether, dibutyl-ether, diamylether and the like may be used to form the boron trifluoride complex. Mixed catalysts may also be used, e. g' boron trifluoride-diethyl ether complex containing some free boron trifluoride.

The catalyst should be added as a cold solution small portionwise in droplet form to avoid a speedy reaction which would result in low molecular weight polymers. For the same reason, it is important that the Friedel-Crafts type catalyst be in dilute enough form to avoid over-reaction. For example, boron trifluoride-diethyl ether complex is diluted in a solvent, e. g. chloroform, in the ratios by volume of catalyst to solvent from 1:1 to 1:2. For the more reactive type catalysts, e. g. boron trifluoride, it may be necessary to add them to the monomer in even more dilute form. It is also pointed out that the reaction is a heterogeneous one. That is, the catalyst remains substantially undissolved in the reaction medium forming a separate phase. Therefore, the catalyst and the solvent mediums should be so selected that the catalyst is not completely dissolved in the solvent-monomer mixture. Homogeneous polymerizations proceeding by way of viscous solutions have not given high rubberlike polymers. Furthermore, the reaction is a proliferous type of polymerization, i. e. the polymer grows around the catalyst. It is believed that this heterogeneous type of reaction avoids a rapid reaction with the concurrent formation of low molecular weight polymers. It may well be that the obtainment of rubberlike polymers of trifluoroethyl vinyl ethers may be due to this heterogenous type of reaction.

The reaction may be carried out by adding the catalyst to the trifluoroethyl vinyl ether solution or the trifluoroethyl vinyl ether solution to the catalyst while avoiding local overheating by addition of the one to the other portionwise. As already stated above, excessive local overheating should be further prevented by precooling both the trifluoroethyl vinyl ether solution and the catalyst to near the reaction temperature prior to bringing them into contact.

After the polymerization has been completed, it is necessary to thoroughly wash the polymeric product with a solvent which penetrates the trifluoroethyl vinyl ether polymer. Without such washing the catalyst residues cause discoloration and polymer instability on heating. The solvent should contain a quenching medium. The term "quenching medium" as used herein refers to a substance which is capable of deactivating the catalyst. Such a quenching medium is normally an alkali, e. g. ammonium hydroxide, sodium hydroxide, potassium hydroxide, or an organic amine, e. g. methylamine, diethylamine, ethanolamine, diethanolamine, pyridine and the like. The quenching step is accomplished while the temperature is still low, i. e. at the reaction temperature, since, if the temperature is high, the same catalyst may catalyze depolymerization. The solvent vehicle for the quenching medium should be a solvent which is capable of penetrating into and swelling the polymeric product. This enables the quenching medium to thoroughly deactivate any catalyst residues. Such solvents may be the lower aliphatic alcohols, e. g. methanol and ethanol. Use of such a solvent washing technique not only quenches or deactivates the catalyst residues but actually removes them. The trifluoroethyl vinyl ether polymer which has been subjected to such a combination wash and quench are stable even at temperatures up to 150° C. and do not require an anti-oxidant stabilizer. On the other hand, polymers which are not so treated are readily discolored due to the catalyst residue present in the polymer.

The invention is further illustrated by the following specific examples although it is to be understood that the invention is not restricted thereto.

*Example 1*

To a mixture of 51 g. of chloroform and 11 g. of purified trifluoroethyl vinyl ether which has been cooled to —80° C. there was added about 100 g. of clean Dry Ice so that the granules of Dry Ice extended to the surface of the liquid mixture. A cold mixture of 1.0 ml. of boron trifluoride-diethyl ether complex and 1.0 ml. of chloroform was added dropwise. Polymerization proceeded slowly. After two hours, the reaction was complete and the temperature was about —60° C.

The polymer was washed and quenched with 5.0 ml. of 28% ammonium hydroxide and 5.0 ml. of ethanol to remove catalyst residues. An additional 50 ml. of ethanol was added to thoroughly wash the polymer while bringing the temperature to about —20° C. The polymer was further washed with 50 ml. of water and the liquid was decanted off the top to separate a white form-stable, non-tacky, rubberlike polymer. The polymeric product was dried for sixteen hours under vacuum at 50°. At the end of the drying period the temperature rose to 100° C., but even at that temperature the product was clear and colorless. 9.8 grams of a form-stable, non-tacky, rubberlike polymer was obtained.

*Example 2*

About 50 g. of Dry Ice granules were added to a mixture of 20 g. of chloroform, 30 g. of petroleum ether, and 11 g. of trifluoroethyl vinyl ether. The reaction vessel was surrounded by a Dry Ice-acetone mixture and the temperature was at about —70° C. A cold mixture of 1.0 ml. of boron trifluoride-diethyl ether and 1.0 ml. of chloroform was added slowly in droplet form. A solid mass of stiff polymer formed and the temperature inside the reaction vessel was near —70° C. After about 80 minutes the polymerization was completed. The polymer was quenched and washed with a mixture of 20 ml. of methanol and 2.0 ml. of 28% ammonium hydroxide which had been previously cooled to —70° C. After all of the quench and wash mixture had been added the temperature was about —60° C. The non-viscous liquid was decanted off, and the solid rubbery mass was further treated at room temperature with a mixture of 50 ml. of water and 3.0 ml. of 28% ammonium hydroxide. The polymeric mass was dried for four days over calcium chloride in a desiccator. The yield was about 8.2 g. The polymer was a tough rubber exhibiting recovery from deformations.

What is claimed is:

1. A high molecular weight, form-stable, non-tacky, rubberlike homopolymer of 2,2,2-trifluoroethyl vinyl ether.

2. The process for the preparation of high molecular weight, form-stable, non-tacky, rubberlike polymers of 2,2,2-trifluoroethyl vinyl ether which comprises polymerizing 2,2,2-trifluoroethyl vinyl ether with a Friedel-Crafts catalyst in a low boiling chlorine-containing solvent which promotes said polymerization selected from the group consisting of chloroform, methyl chloride, methylene chloride, and ethyl chloride, at a temperature ranging from about —40° C. to about —100° C.

3. The process for the preparation of high molecular weight, form-stable, non-tacky, rubberlike polymers of 2,2,2-trifluoroethyl vinyl ether which comprises polymerizing 2,2,2-trifluoroethyl vinyl ether with boron trifluoride-diethyl ether complex in a low boiling chlorine-containing solvent which promotes said polymerization selected from the group consisting of chloroform, methyl chloride, methylene chloride, and ethyl chloride, at a temperature ranging from about —40° C. to about —100° C.

4. The process for the preparation of high molecular weight, form-stable, non-tacky, rubberlike polymers of 2,2,2-trifluoroethyl vinyl ether which comprises polymerizing 2,2,2-trifluoroethyl vinyl ether with boron trifluoride-diethyl ether complex in chloroform at a temperature ranging from about −40° C. to about −100° C.

5. The process for the preparation of high molecular weight, form-stable, non-tacky, rubberlike polymers of 2,2,2-trifluoroethyl vinyl ether which comprises polymerizing 2,2,2-trifluoroethyl vinyl ether with boron trifluoride-diethyl ether complex in chloroform at a temperature ranging from −65° C. to −80° C.

6. The process for the preparation of high molecular weight, form-stable, non-tacky, rubberlike polymers of 2,2,2-trifluoroethyl vinyl ether which comprises polymerizing 2,2,2-trifluoroethyl vinyl ether with a Friedel-Crafts catalyst in a low boiling chlorine-containing solvent selected from the group consisting of chloroform, methyl chloride, methylene chloride, and ethyl chloride, at a temperature ranging from about −40° C. to about −100° C., said temperature being maintained by incorporating granular Dry Ice in the reaction medium.

7. The process for the preparation of high molecular weight, form-stable, non-tacky, rubberlike polymers of 2,2,2-trifluoroethyl vinyl ether which comprises polymerizing 2,2,2-trifluoroethyl vinyl ether with boron trifluoride-diethyl ether complex in chloroform at a temperature ranging from about −40° C. to about −100° C., said temperature being maintained by incorporating granular Dry Ice in the reaction medium.

8. The process for the preparation of high molecular weight, form-stable, non-tacky, rubberlike polymers of 2,2,2-trifluoroethyl vinyl ether which comprises heterogeneously polymerizing 2,2,2-trifluoroethyl vinyl ether with a Friedel-Crafts catalyst in a low boiling chlorine-containing solvent which promotes said polymerization selected from the group consisting of chloroform, methyl chloride, methylene chloride, and ethyl chloride at a temperature ranging from about −40° C. to about −100° C., and deactivating and removing catalyst residues from the polymerization product.

9. The process for the preparation of high molecular weight, form-stable, non-tacky, rubberlike polymers of 2,2,2-trifluoroethyl vinyl ether which comprises polymerizing 2,2,2-trifluoroethyl vinyl ether with boron trifluoride-diethyl ether complex in a low boiling chlorine-containing solvent selected from the group consisting of chloroform, methyl chloride, methylene chloride, and ethyl chloride, at a temperature ranging from about −40° C. to about −100° C., and deactivating and removing catalyst residues from the polymerization product.

10. The process for the preparation of high molecular weight, form-stable, non-tacky, rubberlike polymers of 2,2,2-trifluoroethyl vinyl ether which comprises polymerizing 2,2,2-trifluoroethyl vinyl ether with boron trifluoride-diethyl ether complex in chloroform at a temperature ranging from about −40° C. to about −100° C., and deactivating and removing catalyst residues from the polymerization product by treating said polymerization product with a mixture of an alkaline reacting material in a lower aliphatic alcohol solvent which is capable of swelling and penetrating said polymerization product.

11. The process for the preparation of high molecular weight, form-stable, non-tacky, rubberlike polymers of 2,2,2-trifluoroethyl vinyl ether which comprises polymerizing 2,2,2-trifluoroethyl vinyl ether with a boron trifluoride-diethyl ether complex in a reaction medium comprising a mixture of a low boiling chlorine-containing solvent which promotes said polymerization selected from the group consisting of chloroform, methyl chloride, methylene chloride, and ethyl chloride, and a low boiling saturated aliphatic hydrocarbon at a temperature ranging from about −40° C. to about −100° C., and deactivating and removing catalyst residues from the polymerization product.

12. The process for the preparation of high molecular weight, form-stable, non-tacky, rubberlike polymers of 2,2,2-trifluoroethyl vinyl ether which comprises polymerizing 2,2,2-trifluoroethyl vinyl ether with boron trifluoride-diethyl ether complex in a reaction medium comprising a mixture of chloroform and petroleum ether at a temperature ranging from about −40° C. to about −100° C., and deactivating and removing catalyst residues from the polymerization product by treating said polymerization product with a mixture of an alkaline reacting material in a lower aliphatic alcohol solvent which is capable of swelling and penetrating said polymerization product.

13. The process for the preparation of high molecular weight, form-stable, non-tacky, rubberlike polymers of 2,2,2-trifluoroethyl vinyl ether which comprises polymerizing 2,2,2-trifluoroethyl vinyl ether with boron trifluoride-diethyl ether complex in a reaction medium comprising chloroform at a temperature ranging from about −40° C. to about −100° C., and deactivating and removing catalyst residues from the polymerization product by treating said polymerization product with a mixture of ammonium hydroxide and methanol.

References Cited in the file of this patent

UNITED STATES PATENTS

| | | |
|---|---|---|
| 2,616,879 | Zoss | Nov. 4, 1952 |
| 2,631,975 | Lawson | Mar. 17, 1953 |
| 2,682,527 | Dickey | June 29, 1954 |

OTHER REFERENCES

Chemical Abstracts, 1945, vol. 39, page 5923.